Aug. 30, 1955     A. K. SULLIVAN     2,716,558
ARTICLE CARRYING AND ROLLING TRANSPORT DEVICE
Filed Dec. 28, 1953
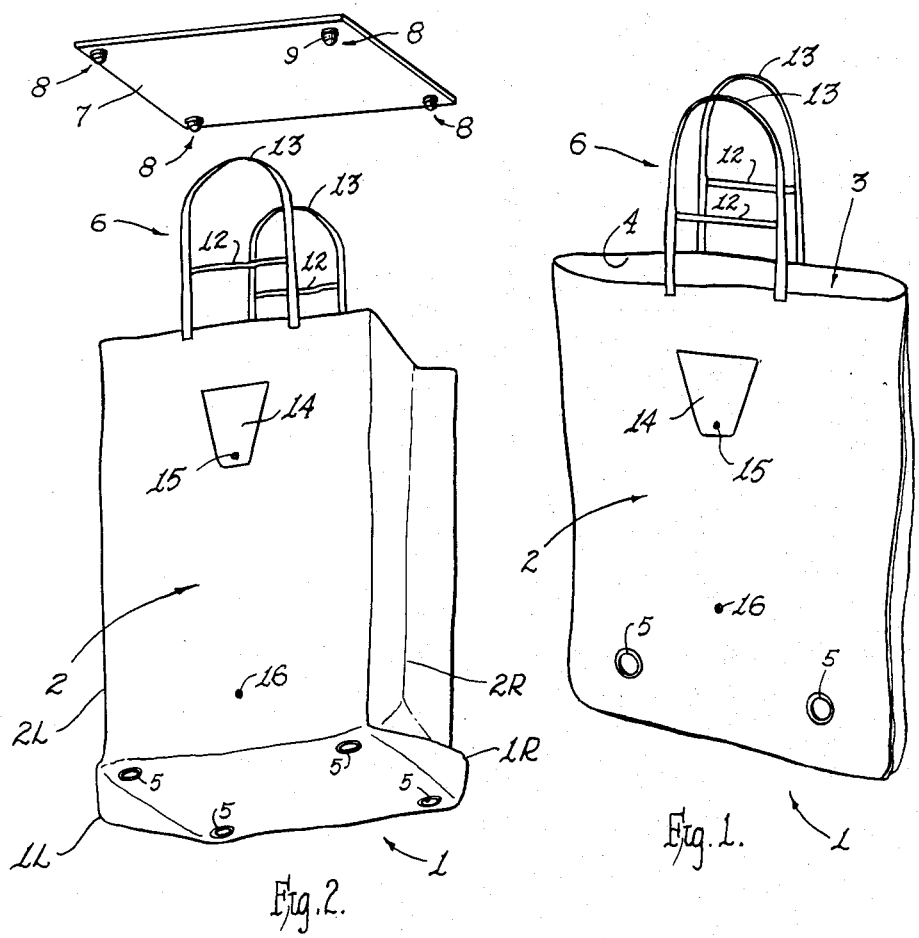
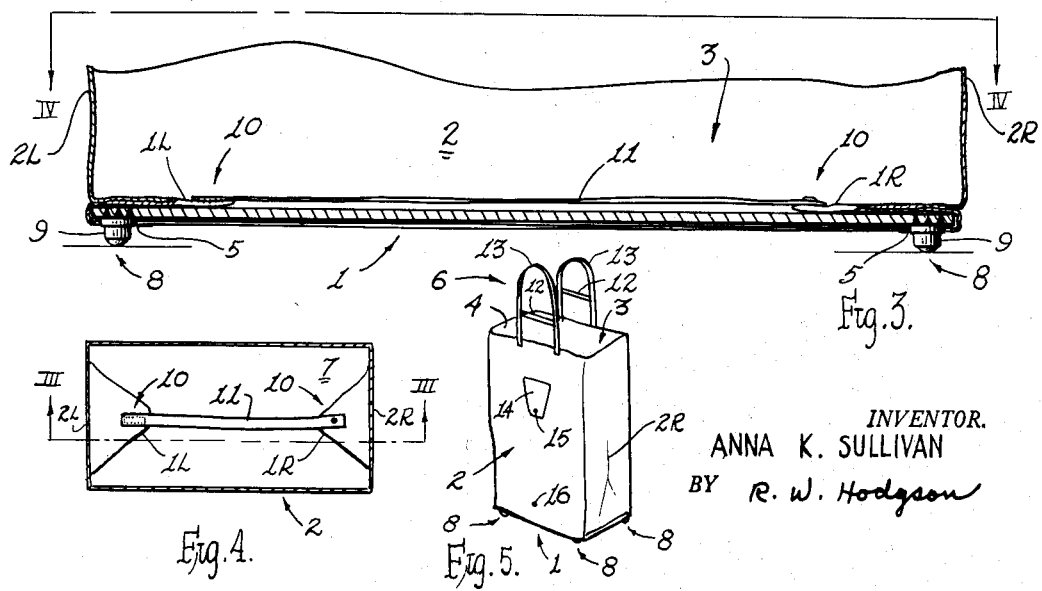
INVENTOR.
ANNA K. SULLIVAN
BY R. W. Hodgson United States Patent Office 2,716,558
Patented Aug. 30, 1955

2,716,558

ARTICLE CARRYING AND ROLLING-TRANSPORT DEVICE

Anna K. Sullivan, Los Angeles, Calif.

Application December 28, 1953, Serial No. 400,695

4 Claims. (Cl. 280—36)

Generally speaking, the present invention relates to an improved article carrying and transporting device and, more particularly, it relates to an improved article carrying and transporting device comprising a flexible bag effectively provided with a base carrying rotatable caster means whereby the device can be rolled along on an underlying surface, such as a floor, when desired and/or can be lifted from such an underlying surface in the usual manner of an article carrying bag, when desired. Thus, the device of the present invention might be rolled from one counter to another during a shopping trip through a store and loaded with various desired articles at various locations in the store and, subsequently, the loaded bag could be either lifted from the underlying surface and carried to a desired destination or could be rolled along an underlying surface to the desired destination.

It should be noted that this application is a continuation-in-part of my co-pending application entitled Rolling Bag; Serial No. 315,532; filed, October 18, 1952, now abandoned.

I am aware of the fact that several prior art attempts to provide a wheeled article carrying bag (or wheeled base adapted to carry a bag) have been made. However, all of such prior art devices, known to me, have serious disadvantages of one type or another.

For example, most such prior art devices, known to me, are nondisassemblable—in other words, they are not capable of being completely disassembled so that the flexible bag portion can be individually laundered and, subsequently, reassembled with respect to the rest of the device for reuse. By reason of this nondisassemblable type of construction, such prior devices are frequently used without cleansing until they are so dirty they must be thrown away; or they must be laundered in association with the wheels, casters or the like forming a part of the device. This latter situation is extremely undesirable because such laundering tends to rust, corrode and mechanically and/or chemically damage said wheels, casters, or the like.

Furthermore, such prior art devices, known to me, are of unstable construction and do not provide adequate support for a full bag of articles unless additional support is provided by the hand of the user of the device grasping the straps or the like at the upper end of the bag.

Furthermore, most such prior art devices are not provided with specific handle means to facilitate lifting and carrying the bag and, also, specific handle means to facilitate transporting the bag by rolling same along an underlying supporting surface.

Furthermore, most such prior art devices do not provide convenient means for folding and fastening the entire device into compact portable form for easy storage or transport during periods of non-use.

One preferred general form of the present invention includes base engaging and retaining means adjacent the bottom portion of the bag and selectively removably cooperable with respect to the base means to effectively engage and retain said base means in juxtaposition with and immediately overlying the bottom portion of the bag.

One preferred form of the present invention is provided with handle means positioned adjacent the port means and including short handle means for bag lifting and carrying purposes and long handle means for bag transporting purposes by rolling the casters along an underlying supporting surface.

One preferred form of the present invention is provided with selectively operable fastening means cooperable to fasten the bag in compact folded position around the base means during periods of non-use.

From the above broad description of the basic and several preferred generic forms of the present invention, it will be apparent to those skilled in the art that virtually all of the hereinbefore-mentioned prior art disadvantages are virtually entirely eliminated and overcome in and through the use of the present invention.

For example, the present invention is completely disassemblable, thus making it possible to remove the flexible bag from association with the base means, the connection means and the caster means whereby the bag can be readily laundered and, subsequently, reassembled with respect to said base means, connection means and caster means for reuse.

Also, the preferred form of stiff base member provided with at least four underlying rotatable casters (particularly, when virtually rectangularly arranged) provides an extremely stable arrangement, adapted to support a full bag without tipping and without requiring that the upper end be additionally supported by a human hand.

Also, the device of the present invention, in one preferred form, includes a specific lifting and carrying handle means and a specific rolling transport handle means adapted to facilitate both modes of use of the device of the present invention.

Also, the device of the present invention, in one preferred form, is adapted to be folded into extremely compact portable form and removably fastened in said compact form for ready storage or transport during period of non-use.

Other and allied objects will be apparent to those skilled in the art after a careful perusal, examination and study of the accompanying illustrations, the present specification and the appended claims.

To facilitate understanding, reference will be made to the hereinbelow-described drawings, in which:

Fig. 1 is a perspective view of one form of bag comprising a part of the present invention prior to its assembly with respect to the remainder of the invention.

Fig. 2 is a perspective, exploded view showing the bag of Fig. 1 with the bottom portion pushed upwardly to an extent such as to provide a flat bottom portion capable of receiving in overlying relationship, the base member, which is shown exploded relative to the bag.

Fig. 3 is a vertical sectional view through the interior of the bag and base member showing said base member in engaged and retained position with respect to the bottom portion of the bag.

Fig. 4 is a view taken in the direction of the arrows IV—IV in Fig. 3 and shows the bag in horizontal section and the base member in plan view.

Fig. 5 is a perspective view of the entire device in fully assembled relationship.

Generally speaking, the device of the present invention includes a bag of thin-sheet flexible material (preferably, though not necessarily, of fabric material) having a bottom wall portion and an encompassing side-wall portion defining a hollow interior region, said bag having port means extending into the hollow interior region.

In the specific example illustrated in Fig. 1, an ordinary fabric bag is shown, which has a bottom portion, indicated generally at 1, and an encompassing side-wall portion, indicated generally at 2, defining a hollow interior region 3 within the bag. Said hollow interior region is accessible through port means 4 at the top of the bag.

The bottom portion 1, in Fig. 1, is also provided with four similar apertures 5, the purpose of which will be described hereinafter.

The upper portion of the bag, in Fig. 1, is also provided with handle means, indicated generally at 6, the purpose of which will be described hereinafter. Incidentally, it should be noted, that the handle means 6 are shown in upstanding relationship with respect to the bag for reasons of clarity, even though it should be understood that, in those cases where said handles are made of flexible materials, they would normally hang down. This is also true of the bag itself.

Fig. 2 illustrates the bag of Fig. 1 with the bottom portion 1 pushed upwardly to assume a virtually flat configuration such as to be able to receive, in overlying relationship, a base means, which in Fig. 2 takes the form of a virtually rectangular flat stiff base member 7. Opposed portions 2L and 2R of the side-wall 2 are also shown appropriately folded in Fig. 2 so as to make the bottom portion 1 of the proper rectangular shape to receive the base member 7. Shaping the bag thus, causes the corners 1L and 1R of the bottom portion 1 of the bag (as best seen in Fig. 1) to project outwardly substantially beyond the remainder of the bag (as best seen in Fig. 2). The purpose of these projecting corners will be explained hereinafter.

When the bottom 1 assumes the configuration shown in Fig. 2, it will be noted that the apertures 5 are laterally virtually rectangularly spaced in the bottom portion 1 to enable them to cooperate with the corresponding virtually rectangularly laterally spaced caster means 8 connected by connection means 9 to the base member 7, when said base member is moved from the exploded position shown in Fig. 2 into overlying relationship with respect to the bottom portion 1, as shown in Fig. 3. When in the assembled relationship shown in Fig. 3, each of the caster means 8 underlies the bottom portion 1 of the bag and is connected (for selective removal) through the aperture means 5 to the base member 7, which overlies said bottom portion 1.

Also, generally speaking, the bag of the present invention includes, adjacent the bottom portion thereof, base engaging and retaining means selectively removably cooperable with respect to the base member to effectively engage and retain said base member in juxtaposition with and immediately overlying the bottom portion of the bag.

In the specific example illustrated in Fig. 3, said base engaging and retaining means is indicated generally at 10 and comprises a strap 11, one end of which is fastened to the inside of the formerly outwardly projecting left corner 1L (which has been turned inside-out so as to project inwardly) and the other end of which is provided with selectively engageable fastening means cooperable with respect to corresponding selectively engageable fastening means carried by the end of the inside-out right bag corner 1R. The arrangement is such that the two inside-out bag corners 1L and 1R and the strap 11 lie across the top of the base member 7 thus effectively retaining it in superimposed relationship with respect to the bottom portion 1 of the bag and also thus, retaining each of the casters 8 in underlying relationship with respect to the bottom portion of the bag by means of the passage of the connection means 8 through the corresponding apertures 5. This is best illustrated in Figs. 3 and 5. It will be understood, that when desired, the engaging and retaining means 10 can be unfastened to allow removal of the base member 7, the connection means 9 and the casters 8 from the bottom portion 1 of the bag, thus leaving the bag in the condition shown in Fig. 1 to allow laundering thereof and the subsequent reassembling of the entire device.

In the specific example illustrated, each connection means 9 comprises the sharpened upper fastening portions of a member peened over at its lower rim to rotatably retain a projecting ball 8, which comprises the caster. This type of construction is advantageous because the caster can be moved in any direction at will and also, because the sharpened upper fastening portions of the connection means can be engaged or fastened to the base member 7 (which may be made of wood, or any other suitable material) by merely hammering said sharpened portions into the base member 7.

Also, generally speaking, the device of the present invention may include handle means positioned adjacent the port means and specifically adapted for use in bag lifting and carrying operations and also specifically adapted for use in bag transporting operation by rolling the casters along an underlying supporting surface.

In the specific form illustrated, said handle means is indicated generally at 6 (as previously mentioned) and includes a pair of short handles 12 of a length such as to be correct for use in lifting and carrying the bag and also includes a pair of long handles 13 of a length such as to be correct for use in rolling the casters 8 along an underlying supporting surface such as a floor, or the like.

Also, generally speaking, the device of the present invention may include selectively operable fastening means carried by the bag and cooperable to fasten the bag in compact, folded position around the base member during periods of non-use.

In the specific example illustrated, said fastening means takes the form of a flap 14 fastened to the bag side-wall 2 and provided with a snap fastener 15 on the outer side of its end; and a second mating snap 16 carried by the side-wall 2 considerably below the flap 14. The arrangement is such that, during periods of non-use, the bag can be folded around the base member 7 (in a direction away from the observer as viewed in Figs. 3 and 5) until completely folded up, and the snap 15 on the end of the tab 14 can then be fastened to the mating snap 16 thus providing a very compact portable arrangement. An additional fastening belt may also be employed, if desired, and may also be adapted for use when the bag is in operative position, as shown in Fig. 5, to pass through the short handle means and to provide an effective linkage means for the purpose of rolling the bag along an underlying surface. Under such circumstances, the long handle means can be eliminated.

Numerous modifications and variations of the present invention will occur to those skilled in the art after a careful study hereof. All such, properly within the basic spirit and scope of the present invention, are intended to be included and comprehended as fully as if specifically described, illustrated and claimed herein.

For example, it should be understood that, while I have referred to the bag as being made of thin-sheet flexible material (such as fabric, or the like), the present invention is not limited to such materials but may be made of a great many different materials.

Furthermore, it should be noted that the handle means may be modified substantially within the spirit of the present invention.

It should also be noted that the fastening means for fastening the bag in folded, compact, portable form may be substantially modified or, in certain forms of the present invention, eliminated entirely.

The base means of the present invention is not limited to the configuration shown nor to the specific material indicated.

The caster means (and the associated connection means) may be modified as to number, position and/or structure. The aperture means (or other means, to allow the connection means to effectively pass through the bottom of the bag) may assume a great variety of forms.

The engaging and retaining means adapted to effectively engage and retain the base means in overlying relationship with respect to the bottom portion of the bag, may be modified substantially within the spirit of the present invention.

The exact compositions, configurations, constructions, relative positionings, and cooperative relationships of the various component parts of the present invention are not critical, and can be modified substantially within the spirit of the present invention.

The embodiments of the present invention specifically described and illustrated herein are exemplary only, and are not intended to limit the scope of the present invention, which is to be interpreted in the light of the prior art and the appended claims only, with due consideration for the doctrine of equivalents.

I claim:

1. An article carrying and transporting device, comprising: a bag of thin-sheet flexible material having a bottom wall portion and an encompassing side-wall portion defining a hollow interior region, said bag having a port at the top thereof extending downwardly into the hollow interior region of the bag; a stiff base member positioned within the hollow interior region of the bag overlying the bottom wall portion thereof; at least four laterally spaced rotatable ball caster means positioned beneath the bottom portion of the bag on the opposite side thereof from the base member and adapted to rest upon an underlying supporting surface for relative movement therealong; at least four aperture means at laterally spaced points in the bottom portion of said bag corresponding to the laterally spaced locations of the underlying caster means; at least four connection means at laterally spaced locations corresponding to the laterally spaced locations of the aperture means and the underlying caster means, each connection means being rotatably connected with respect to the corresponding caster means and selectively removably extending through the corresponding aperture means into fixed engagement with the base member at a different laterally spaced point, said caster means, connection means and base member thereby comprising an effectively unitary structure which can be readily removed, as a unit, from said bottom portion of said bag and which can be readily replaced, as a unit, with respect to said bottom portion of said bag with said base member repositioned above said bottom portion of said bag and with said caster means repositioned below said bottom portion of said bag with said connection means extending through said aperture means; and handle means positioned adjacent said port means.

2. A device of the character defined in claim 1 wherein said bag is provided, adjacent the bottom portion thereof, with base engaging and retaining means selectively removably cooperable with respect to the base member to effectively engage and retain said base member in juxtaposition with and immediately overlying the bottom portion of the bag.

3. A device of the character defined in claim 2 wherein the handle means positioned adjacent the port means includes short handle means for bag lifting and carrying purposes and long handle means for bag transporting purposes by rolling the casters along an underlying supporting surface.

4. An article carrying and transporting device, comprising: a bag of thin-sheet flexible material having a bottom wall portion and an encompassing side-wall portion defining a hollow interior region, said bag having a port at the top thereof extending downwardly into the hollow interior region of the bag; a virtually rectangular stiff base member positioned within the hollow interior region of the bag overlying the bottom wall portion thereof; at least four virtually rectangularly laterally spaced rotatable ball caster means positioned beneath the bottom portion of the bag on the opposite side thereof from the base member and adapted to rest upon an underlying supporting surface for relative movement therealong; at least four aperture means at virtually recangularly laterally spaced points in the bottom portion corresponding to the similarly spaced locations of the underlying caster means; at least four connection means at virtually rectangularly laterally spaced locations corresponding to the similar locations of the aperture means and the underlying caster means, each connection means being rotatably connected with respect to the corresponding caster means and selectively removably extending through the corresponding aperture means into fixed engagement with the base member at a different virtually rectangularly laterally spaced point, said caster means, connection means and base member thereby comprising an effectively unitary structure which can be readily removed, as a unit, from said bottom portion of said bag and which can be readily replaced, as a unit, with respect to said bottom portion of said bag with said base member repositioned above said bottom portion of said bag and with said caster means repositioned below said bottom portion of said bag with said connection means extending through said aperture means; base member engaging and retaining means adjacent the bottom portion of the bag and selectively removably cooperable with respect to the base member to effectively engage and retain said base member in juxtaposition with and immediately overlying the bottom portion of the bag; short handle means positioned adjacent the port means and cooperable for bag lifting and carrying purposes; long handle means positioned adjacent the port means and cooperable for bag transporting purposes by rolling the casters along an underlying supporting surface; and selectively operable fastening means carried by the bag and cooperable to fasten the bag in compact folded position around the base member during periods of non-use.

References Cited in the file of this patent

UNITED STATES PATENTS

| Number | Name | Date |
| --- | --- | --- |
| 429,657 | Spivey | June 10, 1890 |
| 1,616,632 | Mastrontonio | Feb. 8, 1927 |
| 2,459,865 | Bourne | Jan. 25, 1949 |
| 2,465,847 | Coffey | Mar. 29, 1949 |
| 2,597,294 | Connor | May 20, 1952 |